US012014698B2

(12) United States Patent
Suzuki

(10) Patent No.: US 12,014,698 B2
(45) Date of Patent: Jun. 18, 2024

(54) DOT-MATRIX DISPLAY DEVICE AND TIMER APPARATUS

(71) Applicant: KYOCERA Corporation, Kyoto (JP)

(72) Inventor: Takanobu Suzuki, Itami (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 17/919,696

(22) PCT Filed: Apr. 6, 2021

(86) PCT No.: PCT/JP2021/014629
§ 371 (c)(1),
(2) Date: Oct. 18, 2022

(87) PCT Pub. No.: WO2021/215239
PCT Pub. Date: Oct. 28, 2021

(65) Prior Publication Data

US 2023/0162698 A1 May 25, 2023

(30) Foreign Application Priority Data

Apr. 24, 2020 (JP) ................................ 2020-077808

(51) Int. Cl.
*G09G 3/36* (2006.01)

(52) U.S. Cl.
CPC ....... *G09G 3/3677* (2013.01); *G09G 2310/08* (2013.01)

(58) Field of Classification Search
CPC ..... G09G 2330/021; G09G 2300/0857; G09G 2300/0452; G09G 2300/0828
See application file for complete search history.

(56) References Cited

U.S. PATENT DOCUMENTS

2002/0036625 A1* 3/2002 Nakamura ........... G09G 3/3618 345/204
2002/0075211 A1 6/2002 Nakamura
(Continued)

FOREIGN PATENT DOCUMENTS

CN 208207529 U 12/2018
EP 0740285 A2 10/1996
(Continued)

*Primary Examiner* — Van N Chow
(74) *Attorney, Agent, or Firm* — Procopio, Cory, Hargreaves & Savitch LLP

(57) ABSTRACT

A dot-matrix display device includes a display, a converter circuit, and a control circuit. The display includes multiple gate signal lines, multiple source signal lines, and multiple pixel circuits arranged at intersections of the multiple gate signal lines and source signal lines. The converter circuit obtains a serial signal SI in synchronization with a first clock signal SCK input from outside and converts the obtained serial signal to a parallel signal. The serial signal is input from outside serially. The serial signal includes address data for specifying, of the multiple pixel circuits, a pixel circuit to undergo a refresh of image data, and the image data to be provided to the specified pixel circuit. The control circuit generates, based on a second clock signal ENB_V having a lower frequency than the first clock signal, a control signal for controlling timing of serial-to-parallel conversion performed by the converter circuit.

11 Claims, 9 Drawing Sheets

(56) References Cited

U.S. PATENT DOCUMENTS

| | | | | |
|---|---|---|---|---|
| 2010/0128019 | A1* | 5/2010 | Harada ................ | G09G 3/3611 345/212 |
| 2010/0309173 | A1 | 12/2010 | Matsuda et al. | |
| 2014/0340383 | A1* | 11/2014 | Gyouten .............. | G09G 3/3696 345/55 |
| 2020/0302886 | A1* | 9/2020 | Kasuo .................. | G09G 3/3648 |

FOREIGN PATENT DOCUMENTS

| | | | |
|---|---|---|---|
| JP | H10-282938 | A | 10/1998 |
| JP | 2002-175040 | A | 6/2002 |
| JP | 2010-128014 | A | 6/2010 |
| JP | 2015-087437 | A | 5/2015 |
| JP | 2017-156401 | A | 9/2017 |
| WO | 2013/084813 | A1 | 6/2013 |

* cited by examiner

DOT-MATRIX DISPLAY DEVICE AND TIMER APPARATUS

TECHNICAL FIELD

The present disclosure relates to a dot-matrix display device and a timer apparatus including the dot-matrix display device.

BACKGROUND OF INVENTION

A known dot-matrix display device is described in, for example, Patent Literature 1.

CITATION LIST

Patent Literature

Patent Literature 1: Japanese Unexamined Patent Application Publication No. 2015-87437

SUMMARY

In an aspect of the present disclosure, a dot-matrix display device includes a display, a converter circuit, and a control circuit. The display includes a plurality of gate signal lines extending in a first direction, a plurality of source signal lines extending in a second direction intersecting with the first direction, and a plurality of pixel circuits arranged at intersections of the plurality of gate signal lines and the plurality of source signal lines. The converter circuit obtains a serial signal in synchronization with a first clock signal input from outside. The serial signal is input from outside through a serial interface. The serial signal includes address data for specifying, of the plurality of pixel circuits, a pixel circuit to undergo a refresh of image data. The serial signal includes the image data to be provided to the specified pixel circuit. The converter circuit converts the obtained serial signal to a parallel signal. The control circuit generates, based on a second clock signal having a lower frequency than the first clock signal, a control signal for controlling timing of serial-to-parallel conversion performed by the converter circuit.

In another aspect of the present disclosure, a timer apparatus includes the dot-matrix display device according to the above aspect of the present disclosure, and an elapsed time controller that controls a minimum unit time of elapsed time.

BRIEF DESCRIPTION OF THE DRAWINGS

The objects, features, and advantages of the present disclosure will become more apparent from the following detailed description and the drawings.

DESCRIPTION OF EMBODIMENTS

The structure that forms the basis of a dot-matrix display device according to one or more embodiments of the present disclosure will be described. A dot-matrix display device described in Patent Literature 1 includes multiple gate signal lines, multiple source signal lines, and multiple pixel units arranged at intersections of the multiple gate signal lines and the multiple source signal lines. Each pixel unit includes a memory circuit. In such a dot-matrix display device, a pixel unit selected based on a gate signal line and a source signal line is refreshed by refreshing image data, and each unselected pixel unit displays a still image using image data retained in the memory circuit.

In a known dot-matrix display device, address data for selecting pixel units to undergo a refresh and image data to be provided to the selected pixel units are input in series (serially). Thus, the transfer time of the address data and the image data may be longer, causing a slower operation. For a known dot-matrix display device, a higher clock frequency set to shorten transfer time may be more difficult to follow by a control circuit that controls a refresh, possibly causing an improper operation.

A dot-matrix display device according to one or more embodiments of the present disclosure will now be described with reference to the accompanying drawings. Each figure referred to below illustrates main components and other elements of the dot-matrix display device according to one or more embodiments of the present disclosure. In one or more embodiments of the present disclosure, the dot-matrix display device may include known components that are not illustrated, for example, circuit boards, wiring conductors, control integrated circuits (ICs), and large-scale integration (LSI) circuits.

Figure 1:
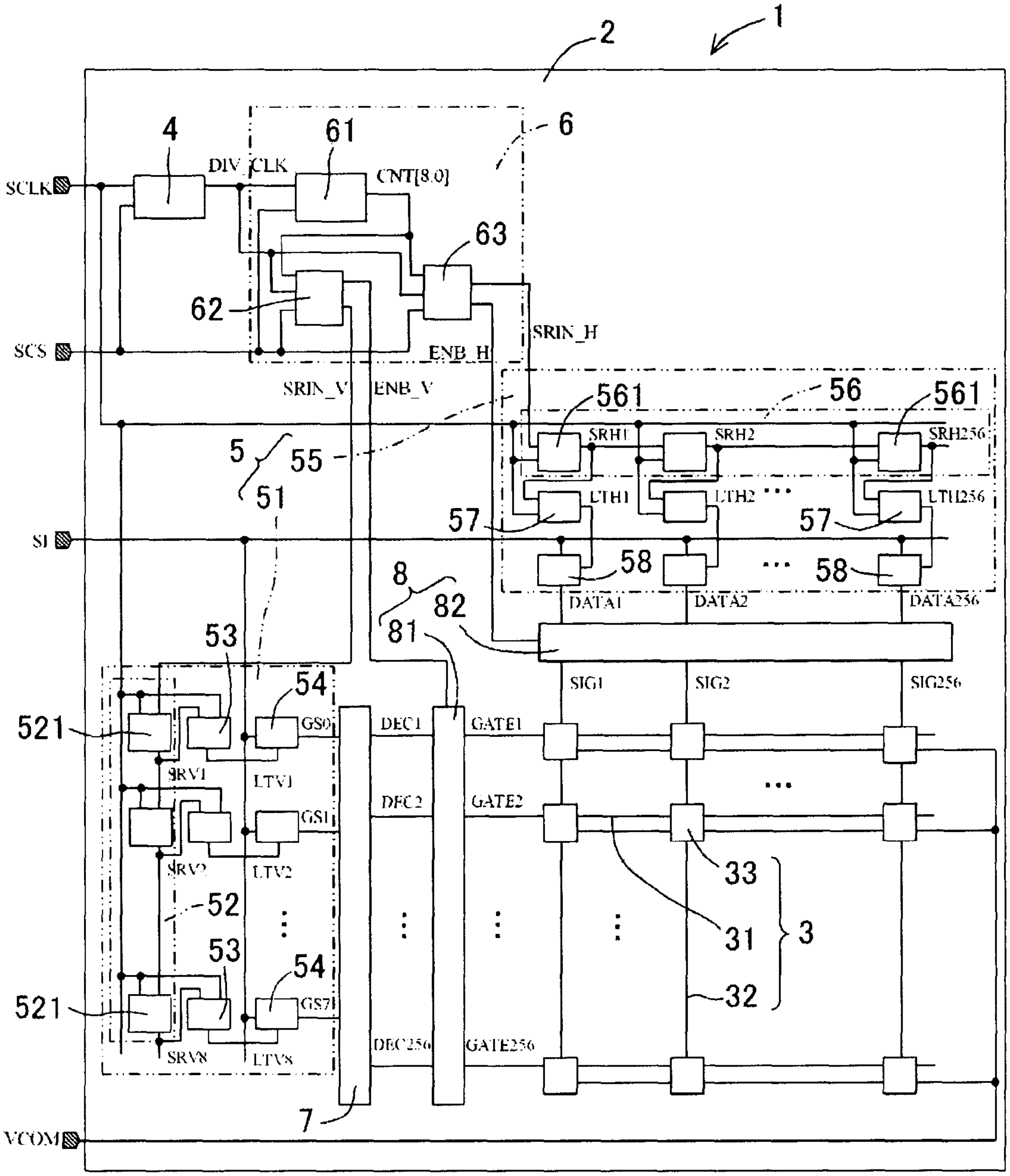
FIG. 1 is an example block diagram of a dot-matrix display device according to an embodiment of the present disclosure.
Figure 2:
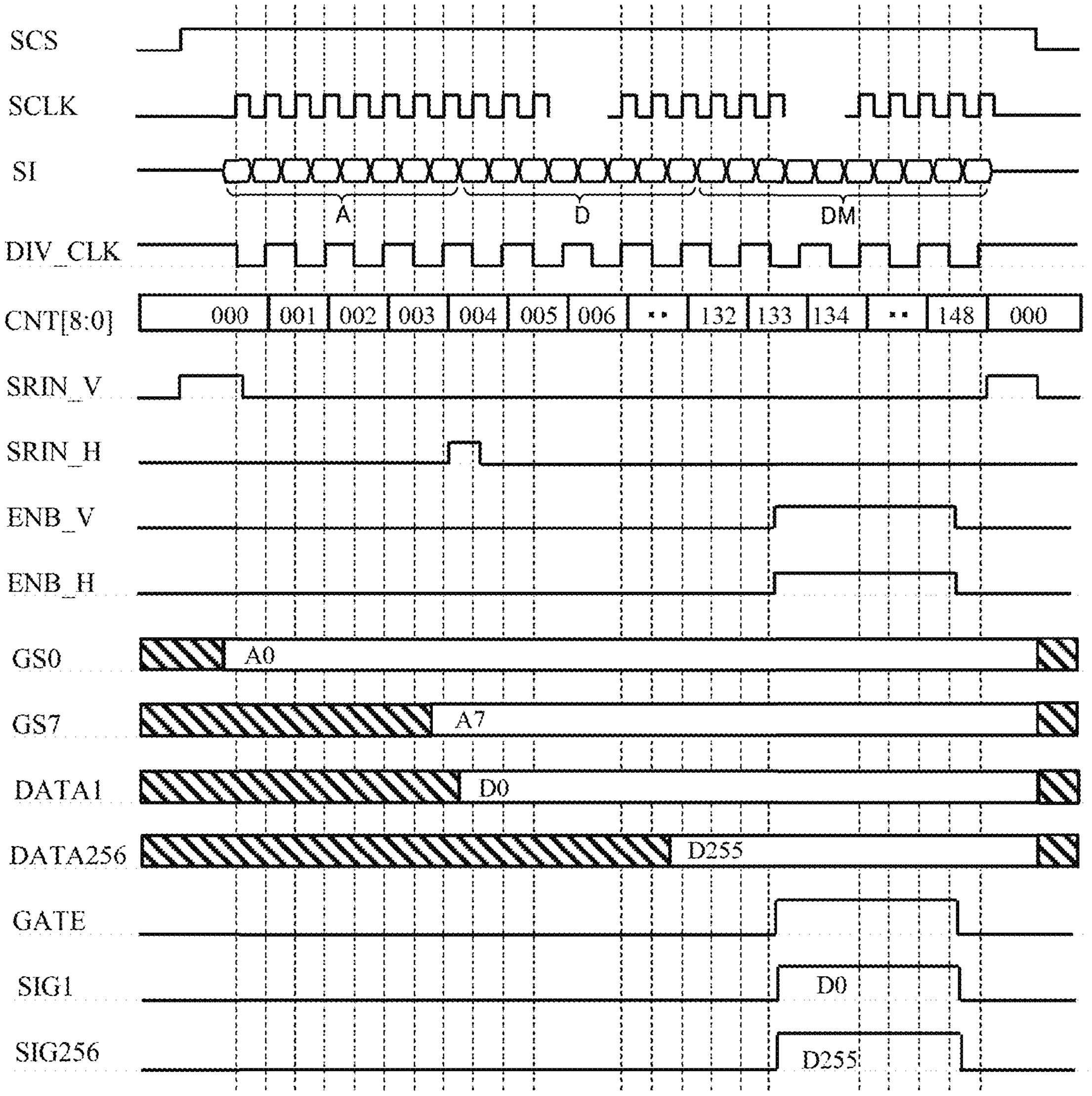
FIG. 2 is a part of a timing chart describing an overall operation of the dot-matrix display device in FIG. 1.
Figure 3:
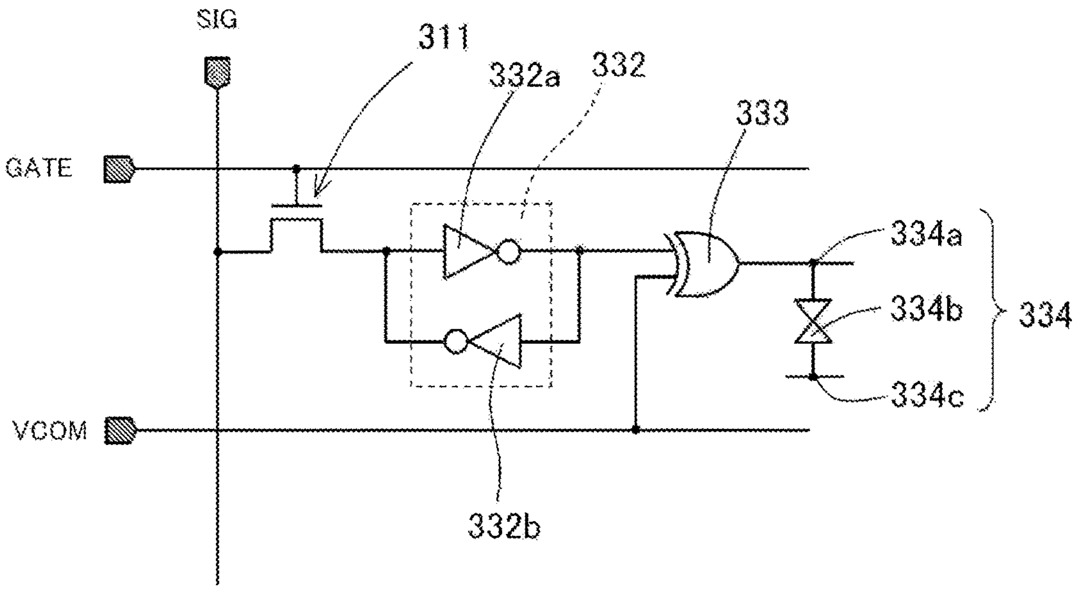
FIG. 3 is an example circuit diagram of a pixel circuit in the dot-matrix display device in FIG. 1.
Figure 4:
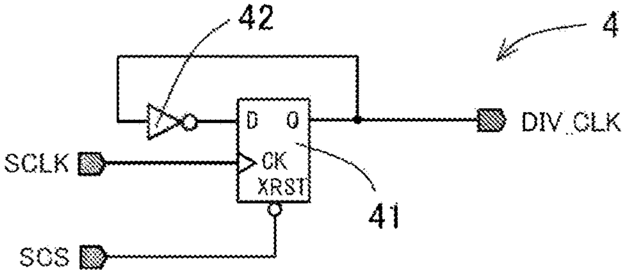
FIG. 4 is an example circuit diagram of a frequency divider circuit in the dot-matrix display device in FIG. 1.
Figure 5A:
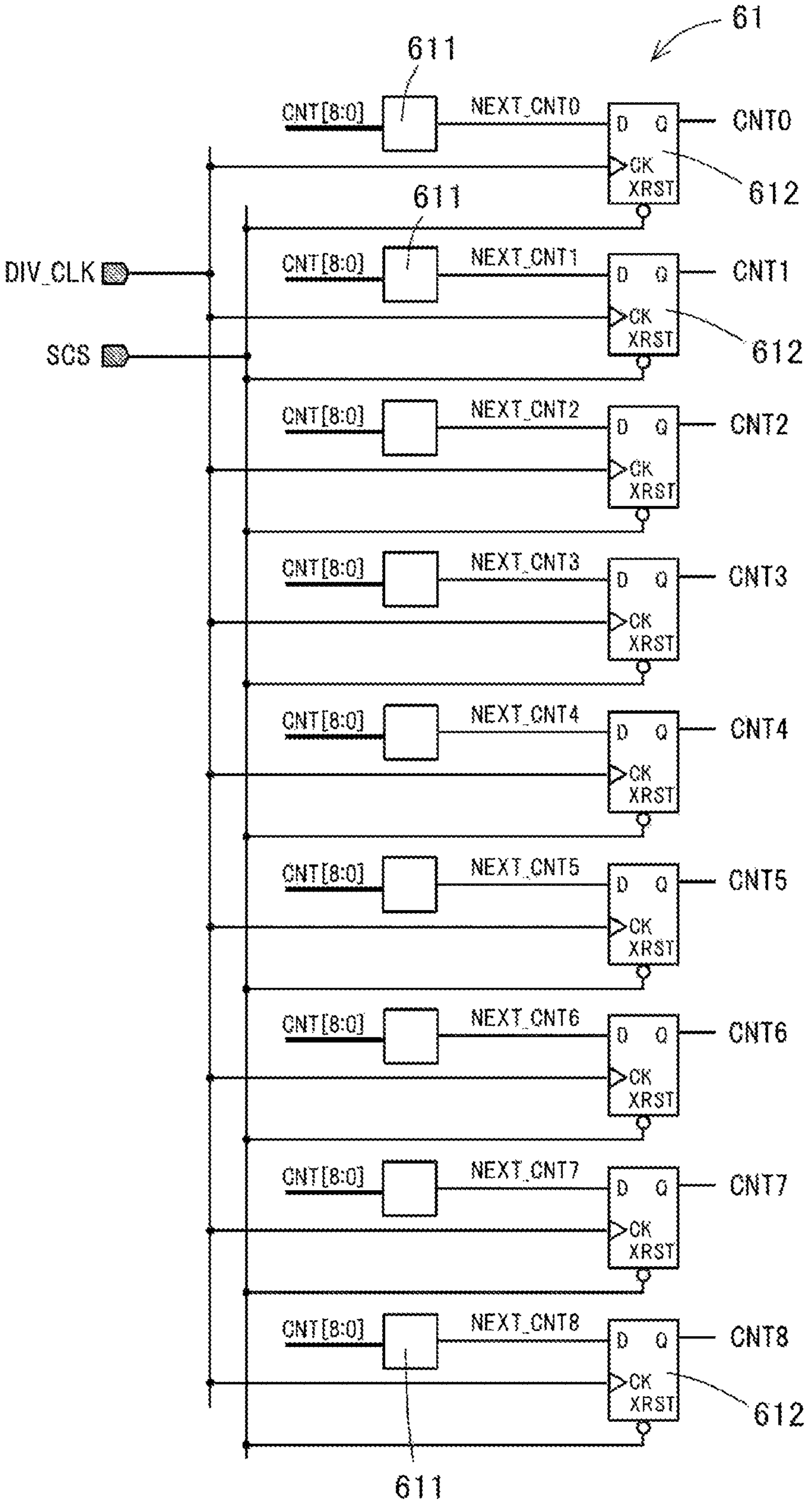
FIG. 5A is an example circuit diagram of a control circuit in the dot-matrix display device in FIG. 1.
Figure 5B:
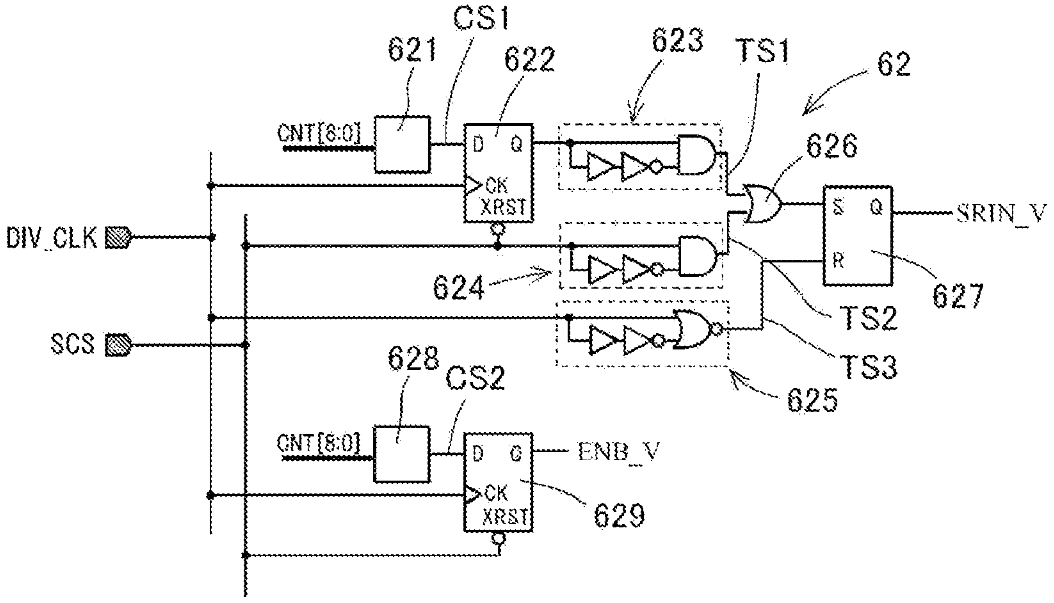
FIG. 5B is an example circuit diagram of the control circuit in the dot-matrix display device in FIG. 1.
Figure 5C:
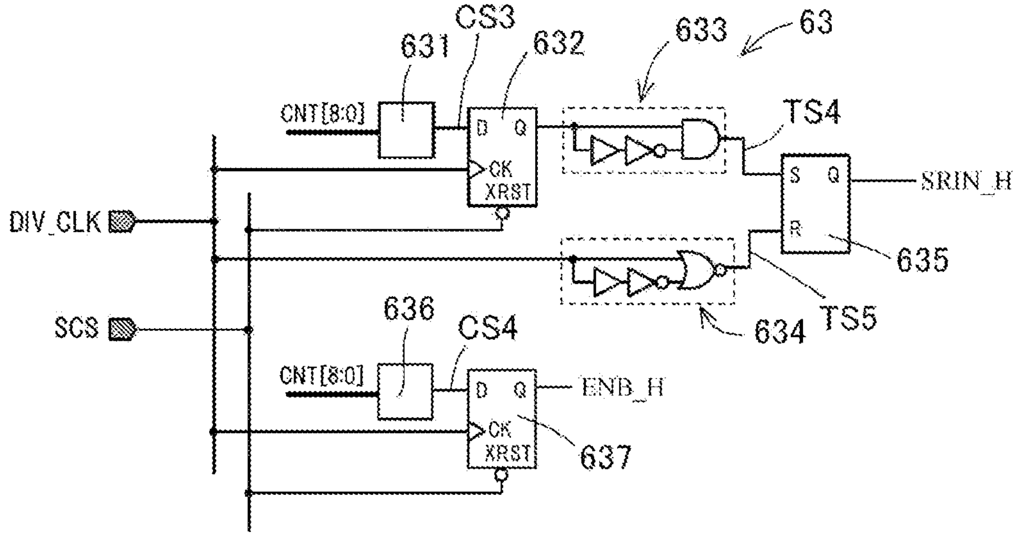
FIG. 5C is an example circuit diagram of the control circuit in the dot-matrix display device in FIG. 1.
Figure 8:
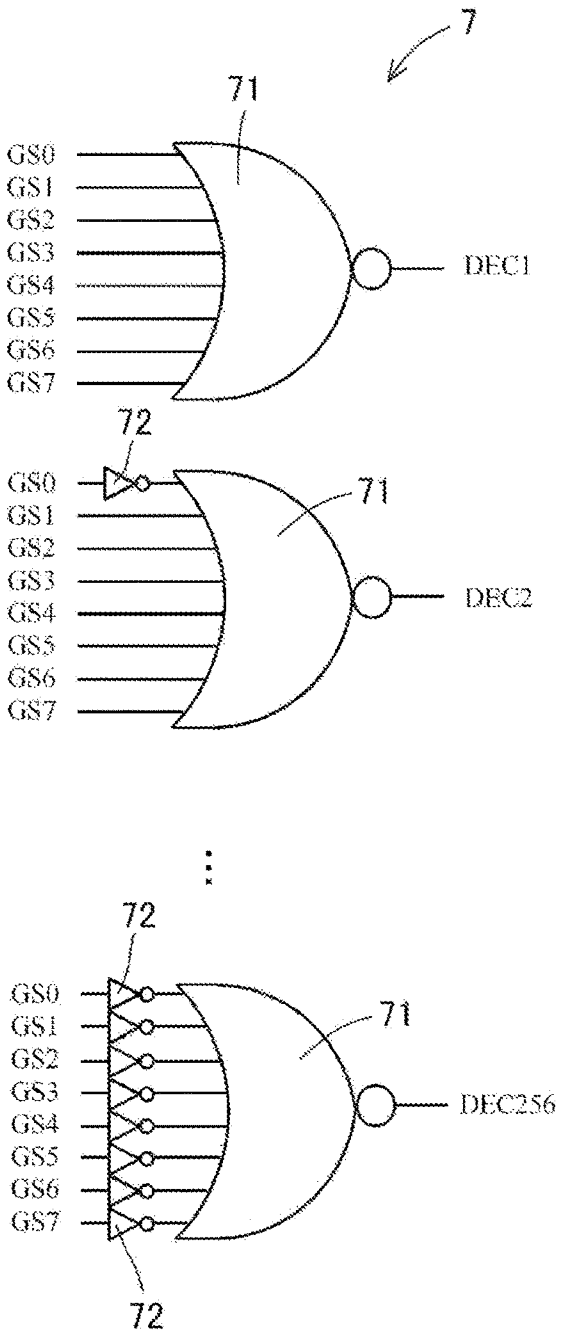
FIG. 8 is an example circuit diagram of a decoder circuit in the dot-matrix display device in FIG. 1.
Figure 9A:
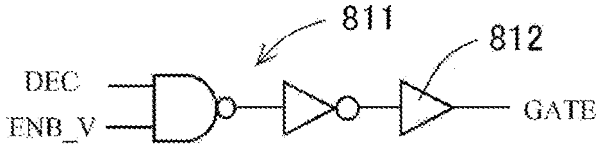
FIG. 9A is an example circuit diagram of a drive circuit in the dot-matrix display device in FIG. 1.
Figure 9B:
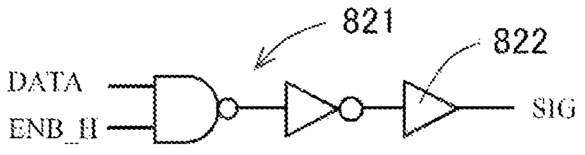
FIG. 9B is an example circuit diagram of the drive circuit in the dot-matrix display device in FIG. 1.
Figure 10:
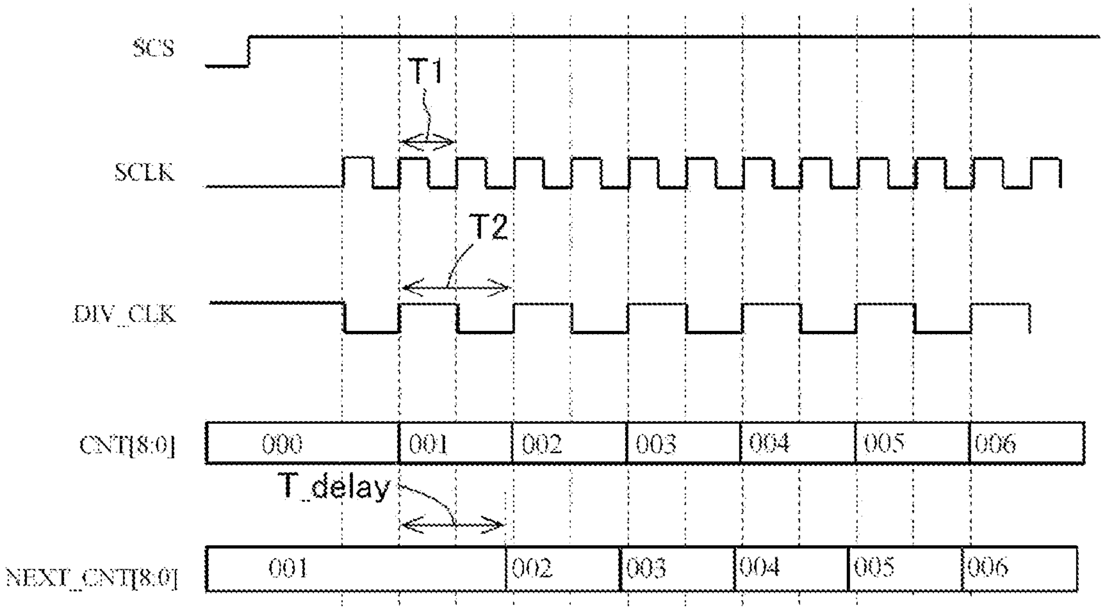
FIG. 10 is a part of a timing chart describing an operation of a counter circuit in the dot-matrix display device in FIG. 1.

FIG. 1 is an example block diagram of the dot-matrix display device according to an embodiment of the present disclosure. FIG. 2 is a part of a timing chart describing an overall operation of the dot-matrix display device in FIG. 1. FIG. 3 is an example circuit diagram of a pixel circuit in the dot-matrix display device in FIG. 1. FIG. 4 is an example circuit diagram of a frequency divider circuit in the dot-matrix display device in FIG. 1. FIGS. 5A to 5C are example circuit diagrams of a control circuit in the dot-matrix display device in FIG. 1. FIGS. 6A to 6C and 7A to 7C are example circuit diagrams of a converter circuit in the dot-matrix display device in FIG. 1. FIG. 8 is an example circuit diagram of a decoder circuit in the dot-matrix display device in FIG. 1. FIGS. 9A and 9B are example circuit diagrams of a drive circuit in the dot-matrix display device in FIG. 1. FIG. 10 is a part of a timing chart describing an operation of a counter circuit in the dot-matrix display device in FIG. 1. Although the dot-matrix display device described below has 65536 dots (256×256 dots) of pixels, the dot-matrix display device may have any number of pixels. Although the pixel circuits described below display black and white, the pixel circuits may display gradients or full colors.

A dot-matrix display device 1 according to the present embodiment may include a display 3, a frequency divider circuit 4, a converter circuit 5, and a control circuit 6.

The display 3 is located on a main surface of a substrate 2. The substrate 2 is, for example, a transparent or opaque glass substrate, a plastic substrate, or a ceramic substrate. The substrate 2 may be in the shape of, for example, a polygonal plate such as a rectangular plate, a circular plate, or an oval plate, or in another shape.

The display 3 includes multiple gate signal lines 31, multiple source signal lines 32, and multiple pixel circuits 33. The multiple gate signal lines 31 are arranged in a first direction (e.g., a row direction). The multiple source signal lines 32 are arranged in a second direction (e.g., a column direction) intersecting with the first direction. The multiple pixel circuits 33 are arranged in a matrix at intersections of the multiple gate signal lines 31 and the multiple source signal lines 32.

Among the multiple pixel circuits 33, one or more pixel circuits 33 to undergo a refresh of image data, or to be refreshed, are selected based on address data input from an external signal provider (not illustrated). For the selected one or more pixel circuits 33, the image data is refreshed. New image data used in the refresh is input from the signal provider. Unselected pixel circuits 33 display still images using image data retained in the pixel circuits 33.

As illustrated in, for example, FIG. 3, each pixel circuit 33 includes a write switch circuit 331, a latch circuit 332, a pixel potential generation circuit 333, and a liquid crystal element 334. The liquid crystal element 334 includes a pixel electrode 334*a*, liquid crystal 334*b*, and an opposite electrode 334*c*.

The write switch circuit 331 includes a thin-film transistor (TFT) element. The TFT element includes a semiconductor film of, for example, amorphous silicon (a-Si) or low-temperature polycrystalline silicon (LTPS), a gate electrode, a source electrode, and a drain electrode. The gate electrode is connected to one of the multiple gate signal lines 31. The source electrode is connected to one of the multiple source signal lines 32. The drain electrode is connected to an input terminal of the latch circuit 332.

As illustrated in, for example, FIG. 3, the latch circuit 332 includes a static random-access memory (SRAM) including a first complementary metal-oxide semiconductor (CMOS) inverter 332*a* and a second CMOS inverter 332*b* connected in a loop. The latch circuit 332 includes the first CMOS inverter 332*a* and the second CMOS inverter 332*b* connected in series. The second CMOS inverter 332*b* feeds an output from its drain common connection point back into a gate common connection point of the first CMOS inverter 332*a*. In response to a high-level signal (hereafter, simply referred to as a H signal) input into the gate common connection point of the first CMOS inverter 332*a*, the first CMOS inverter 332*a* outputs a low-level signal (hereafter, simply referred to as a L signal) from its drain common connection point. In response to the L signal from the first CMOS inverter 332*a* input into a gate common connection point of the second CMOS inverter 332*b*, the second CMOS inverter 332*b* outputs a H signal from its drain common connection point. The H signal is fed back to the gate common connection point of the first CMOS inverter 332*a*. Thus, H, L, and H signals are constantly retained on the looped transmission line.

The pixel potential generation circuit 333 includes an exclusive-OR (EXOR) logic gate circuit as illustrated in, for example, FIG. 3. The pixel potential generation circuit 333 includes two input terminals. One input terminal receives a write data signal SIG retained in the latch circuit 332, and the other input terminal receives a common voltage VCOM provided from an external device. The common voltage VCOM may be periodically reversed between a high-level (H) voltage (e.g., 3 V) and a low-level (L) voltage (e.g., 0 V). For example, in response to a write data signal SIG retained in the latch circuit 332 being a L signal, an electric potential difference occurs between the voltage at the opposite electrode 334*c* and the pixel electrode 334*a*. Thus, black is displayed in the normally white mode, and white is displayed in the normally black mode. In response to a write data signal SIG retained in the latch circuit 332 being a H signal, no electric potential difference occurs between the voltage at the opposite electrode 334*c* and the pixel electrode 334*a*. Thus, white is displayed in the normally white mode, and black is displayed in the normally black mode. Although the common voltage VCOM is driven reversely, the pixel circuit 33 operating in the above manner can maintain the electric potential difference between the voltage at the opposite electrode 334*c* and the pixel electrode 334*a*. Thus, the pixel circuit 33 can operate on alternate current with an image remaining displayed on the pixel circuit 33. This can reduce deterioration of the liquid crystal 334*b* in the pixel circuit 33.

To refresh an image displayed on the pixel circuit 33, the write switch circuit 331 is turned on. In other words, a H signal is provided to a gate signal line 31, and an image data signal is provided to a source signal line 32. The image data signal provided to the source signal line 32 is transmitted to the latch circuit 332 and retained in the latch circuit 332. The electric potential difference between the voltage at the opposite electrode 334*c* and the pixel electrode 334*a* changes in accordance with the image data signal. For example, in response to the image data signal being a L signal, black is displayed in the normally white mode and white is displayed in the normally black mode. In response to the image data signal being a H signal, white is displayed in the normally white mode and black is displayed in the normally black mode.

In the pixel circuit 33, the latch circuit 332 may retain multiple bits. In this case, the pixel circuit 33 can display gradients. The pixel circuit 33 may include a subpixel circuit for displaying red gradients, a subpixel circuit for displaying green gradients, and a subpixel circuit for displaying blue gradients. In this case, the pixel circuits 33 can display full colors.

In the dot-matrix display device 1, a refresh of the display 3 can be performed for individual pixel circuits 33 connected to a single gate signal line 31. The other pixel circuits 33 can display still images. This reduces the power consumption of the dot-matrix display device 1.

As illustrated in, for example, FIG. 4, the frequency divider circuit 4 divides the frequency of a shift clock signal SCLK (hereafter, also referred to as a first clock signal) input from the signal provider, and generates a clock signal DIV_CLK (hereafter, also referred to as a second clock signal) having a lower frequency than the first clock signal SCLK. The signal provider generates a first clock signal SCLK based on, for example, a video signal, a synchronization signal, or a clock signal input from an external device, for example, a TV receiver or a personal computer, and outputs the first clock signal SCLK to the dot-matrix display device 1. The signal provider also generates a serial signal SI and a chip select signal SCS (described later), and outputs these signals to the dot-matrix display device 1.

In the present embodiment, the dot-matrix display device 1 may include a clock frequency controller that controls the frequency of the first clock signal SCLK. This structure allows the first clock signal SCLK to easily have a higher frequency. The clock frequency controller may be included in the signal provider described above or may be located separately from the signal provider. The clock frequency controller may be a software program stored in a random-access memory (RAM) or a read-only memory (ROM) in a drive element, for example, an IC or an LSI circuit, or, for example, a frequency control circuit formed on a circuit board.

Although the dot-matrix display device 1 according to the present embodiment uses the frequency divider circuit 4 to divide the frequency of the first clock signal SCLK to generate the second clock signal DIV_CLK having a lower frequency than the first clock signal SCLK, another structure may be used. For example, the dot-matrix display device 1 may include a first clock signal generator for generating the first clock signal SCLK and a separate second clock signal generator for generating the second clock signal DIV_CLK. This structure can control the frequencies of the first clock signal SCLK and the second clock signal DIV_CLK more precisely.

As illustrated in, for example, FIG. 4, the frequency divider circuit 4 includes a flip-flop circuit 41 and an inverter circuit 42. The flip-flop circuit 41 includes a D terminal, a CK terminal, a Q terminal, and an XRST terminal. The CK terminal receives a first clock signal SCLK. The Q terminal is connected to an input terminal of the inverter circuit 42, and the D terminal is connected to an output terminal of the inverter circuit 42. The XRST terminal receives a chip select signal SCS. The chip select signal SCS is at a high level (H) during a refresh of the display 3. Through the frequency divider circuit 4, the frequency of a second clock signal DIV_CLK output from the Q terminal is half the frequency of the first clock signal SCLK. The frequency divider circuit 4 may divide the frequency of a signal by any number. The frequency divider circuit may divide the frequency of the first clock signal SCLK by, for example, three, four, or n (n is an integer greater than or equal to 2). In response to the first clock signal SCLK with a higher frequency, n may be a greater number.

The converter circuit 5 obtains a serial signal SI input from the signal provider in synchronization with the first clock signal SCLK. The serial signal SI is input, through a serial interface, from the signal provider into the converter circuit 5. The converter circuit 5 converts the obtained serial signal SI to a parallel signal.

In the present embodiment, as illustrated in, for example, FIG. 2, the serial signal SI includes pieces of address data A0 to A7 (or simply A collectively) and pieces of image data D0 to D255 (or simply D collectively). The pieces of address data A0 to A7 specify (or select), from the multiple pixel circuits 33, one or more pixel circuits 33 to undergo a refresh of image data. The pieces of image data D0 to D255 are provided to the selected one or more pixel circuits 33 to provide images to be displayed on the selected one or more pixel circuits 33.

The serial signal SI may include dummy data DM that is not used for a refresh. In the present embodiment, as illustrated in, for example, FIG. 2, the serial signal SI includes pieces of dummy data DM0 to DM31 (or simply DM collectively).

The serial signal SI is transferred to the converter circuit 5 in synchronization with the first clock signal SCLK. In transferring the serial signal SI, as illustrated in, for example, FIG. 2, the pieces of address data A0 to A7 may be transferred in the initial eight clocks, the pieces of image data D0 to D255 in the next 256 clocks, and the pieces of dummy data DM0 to DM31 in the subsequent 32 clocks.

The transfer period of the dummy data DM may be used as, for example, a refresh period during which a refresh is performed. This may increase the operation speed. In other words, the transfer period of the dummy data DM may be an active period of a gate signal GATE during which the gate signal GATE based on the address data A is provided to a gate signal line 31 and an active period of source signals during which the source signals based on the image data D are provided to source signal lines 32.

The transfer period of the dummy data DM may be shorter than or equal to a total of the transfer periods of the address data A and the image data D. This may increase the operation speed. The transfer period of the dummy data DM may be, but not limited to, 0.5 to 1 times the total of the transfer periods of the address data A and the image data D.

The transfer period of the dummy data DM may be shorter than or equal to at least one of the transfer period of the address data A or the transfer period of the image data D. This may increase the operation speed. The transfer period of the dummy data DM may be, but not limited to, 0.7 to 1 times at least one of the transfer period of the address data A or the transfer period of the image data D.

The transfer period of the dummy data DM may be shorter than or equal to the shorter one of the transfer period of the address data A and the transfer period of the image data D. This may increase the operation speed. The transfer period of the dummy data DM may be, but not limited to, 0.7 to 1 times the shorter one of the transfer period of the address data A and the transfer period of the image data D.

The control circuit 6 controls a refresh of the display 3. The control circuit 6 operates in synchronization with the second clock signal DIV_CLK. The control circuit 6 generates control signals for controlling serial-parallel (serial-to-parallel) conversion in the converter circuit 5, or more specifically, control signals for controlling serial-parallel conversion timing in the converter circuit 5.

The control circuit 6 includes a counter circuit (counting circuit) 61, a vertical control circuit 62, and a horizontal control circuit 63.

The counter circuit 61 operates in synchronization with the second clock signal DIV_CLK and generates a counter signal (count signal) CNT[8:0]. The counter signal CNT[8:0] counts the number of rising edges of the second clock signal DIV_CLK, which is a pulse signal. The counter signal CNT[8:0] is used to generate the control signals for controlling serial-parallel conversion performed by the converter circuit 5.

The counter circuit 61 that is, for example, a synchronous counter circuit as illustrated in FIG. 5A, includes multiple combinational logic circuits 611 and multiple flip-flop circuits 612.

Each combinational logic circuit 611 includes multiple logic gate circuits. Each flip-flop circuit 612 includes a D terminal, a Q terminal, CK terminal, and an XRST terminal. Each flip-flop circuit 612 outputs a bit of a counter signal CNT[8:0] (one of signals CNT0 to CNT8 illustrated in FIG. 5A) from the Q terminal. Based on the counter signal CNT[8:0], each combinational logic circuit 611 generates a bit of the next counter signal NEXT_CNT[8:0] (one of signals NEXT_CNT0 to NEXT_CNT8 illustrated in FIG. 5A), which is input into the D terminal. The CK terminal receives the second clock signal DIV_CLK. The XRST terminal receives the chip select signal SCS.

A combinational logic circuit typically includes logical gates that calculate basic logical functions, or for example, a NOT gate, an AND gate, and an OR gate, and wires that connect the logical gates, and include no feedback loop. The combinational logic circuit includes multiple inputs and an output (usually one output), with its input values and output value being either 0 or 1. Each output value is uniquely determined simply by a combination of input values. In other words, the combinational logic circuit calculates a logical function. A logical function can be expressed using a sum-of-products form logical expression. Using NOT, AND, and OR logical gates, NOT, AND, and OR combinational circuits can achieve any logical functions. Such a circuit is typically referred to as an AND-OR two-level combinational logic circuit. A logic circuit having many levels operates slower. Thus, the combinational logic circuits 611 often limit the maximum frequency of the first clock signal SCLK (about 1.5 MHz with a known structure).

The vertical control circuit 62 generates a vertical start pulse signal SRIN_V and a gate activity signal ENB_V based on the counter signal CNT[8:0] output from the counter circuit 61. The vertical start pulse signal SRIN_V starts a shift register that generates timing signals for obtaining pieces of address data A0 to A7. The vertical start pulse signal SRIN_V is active at the start of the address data A. A signal being active herein refers to a signal in an on-state (specifically, in a high or H state), and a signal being inactive herein refers to a signal in an off state (specifically, in a low or L state). The gate activity signal ENB_V determines the active period of a gate signal GATE provided to a gate signal line 31. The gate activity signal ENB_V is active when the dummy data DM is transferred after the address data A and the image data D are transferred.

As illustrated in, for example, FIG. 5B, the vertical control circuit 62 includes a combinational logic circuit 621, a flip-flop circuit 622, a first one-shot pulse circuit 623, a second one-shot pulse circuit 624, a third one-shot pulse circuit 625, a logical sum (OR) logic gate circuit (hereafter, also referred as an OR circuit) 626, and an RS latch circuit 627.

The combinational logic circuit 621 includes multiple logic gate circuits. Based on the counter signal CNT[8:0] generated by the counter circuit 61, the combinational logic circuit 621 generates a first control signal CS1, which is output to the flip-flop circuit 622.

The flip-flop circuit 622 includes a D terminal, a Q terminal, a CK terminal, and an XRST terminal. The D terminal receives the first control signal CS1 generated by the combinational logic circuit 621. The CK terminal receives the second clock signal DIV_CLK. The XRST terminal receives the chip select signal SCS. The Q terminal is connected to the first one-shot pulse circuit 623. The flip-flop circuit 622 retains the first control signal CS1 at the rising edge of the second clock signal DIV_CLK, and outputs the first control signal CS1 to the first one-shot pulse circuit 623.

The first one-shot pulse circuit 623 includes a delay circuit and a logical product (AND) logic gate circuit. At the rise of the first control signal CS1 output from the flip-flop circuit 622, the first one-shot pulse circuit 623 generates a first trigger signal TS1, which is output to the OR circuit 626.

The second one-shot pulse circuit 624 includes a delay circuit and an AND logic gate circuit. At the rise of the chip select signal SCS, the second one-shot pulse circuit 624 generates a second trigger signal TS2, which is output to the OR circuit 626.

The third one-shot pulse circuit 625 includes a delay circuit and a negated logical sum (NOR) logic gate circuit. At the fall of the second clock signal DIV_CLK, the third one-shot pulse circuit 625 generates a third trigger signal TS3, which is output to the RS latch circuit 627.

The OR circuit 626 calculates a logical sum of the first trigger signal TS1 output from the first one-shot pulse circuit 623 and the second trigger signal TS2 output from the second one-shot pulse circuit 624, and outputs the logical sum to the RS latch circuit 627.

The RS latch circuit 627 includes an S terminal, an R terminal, and a Q terminal. The S terminal receives the logical sum of the first trigger signal TS1 and the second trigger signal TS2 output from the OR circuit 626. The R terminal receives the third trigger signal TS3 output from the third one-shot pulse circuit 625. The RS latch circuit 627 outputs a vertical start pulse signal SRIN_V from the Q terminal. The RS latch circuit 627 operates in a known manner. For example, in response to a L signal input at the S terminal and a H signal input at the R terminal, the RS latch circuit 627 outputs a L signal as a vertical start pulse signal SRIN_V from the Q terminal. This output state is maintained when the S terminal or the R terminal receives the unchanged signal or both the S terminal and the R terminal receive L signals. In response to a H signal input at the S terminal and a L signal input at the R terminal, the RS latch circuit outputs a H signal as a vertical start pulse signal SRIN_V from the Q terminal. This output state is maintained when the S terminal or the R terminal receives the unchanged signal or both the S terminal and the R terminal receive L signals.

As illustrated in, for example, FIG. 5B, the vertical control circuit 62 includes a combinational logic circuit 628 and a flip-flop circuit 629.

The combinational logic circuit 628 includes multiple logic gate circuits. Based on the counter signal CNT[8:0] generated by the counter circuit 61, the combinational logic circuit 628 generates a second control signal CS2, which is output to the flip-flop circuit 629.

The flip-flop circuit 629 includes a D terminal, a Q terminal, a CK terminal, and an XRST terminal. The D terminal receives the second control signal CS2 generated by the combinational logic circuit 628. The CK terminal receives the second clock signal DIV_CLK. The XRST terminal receives the chip select signal SCS. The flip-flop circuit 629 outputs a gate activity signal ENB_V from the Q terminal. The flip-flop circuit 629 retains the second control signal CS2 at the rising edge of the second clock signal DIV_CLK, and outputs the second control signal CS2 as a gate activity signal ENB_V.

As illustrated in, for example, FIG. 5C, the horizontal control circuit 63 includes a combinational logic circuit 631, a flip-flop circuit 632, a fourth one-shot pulse circuit 633, a fifth one-shot pulse circuit 634, and an RS latch circuit 635.

The combinational logic circuit 631 includes multiple logic gate circuits. Based on the counter signal CNT[8:0] generated by the counter circuit 61, the combinational logic circuit 631 generates a third control signal CS3, which is output to the flip-flop circuit 632.

The flip-flop circuit 632 includes a D terminal, a Q terminal, a CK terminal, and an XRST terminal. The D terminal receives the third control signal CS3 generated by the combinational logic circuit 631. The CK terminal receives the second clock signal DIV_CLK. The XRST terminal receives the chip select signal SCS. The Q terminal is connected to the fourth one-shot pulse circuit 633. The flip-flop circuit 632 retains the third control signal CS3 at the rising edge of the second clock signal DIV_CLK, and outputs the third control signal CS3 to the fourth one-shot pulse circuit 633.

The fourth one-shot pulse circuit 633 includes a delay circuit and an AND logic gate circuit. At the rise of the third control signal CS3 output from the flip-flop circuit 632, the fourth one-shot pulse circuit 633 generates a fourth trigger signal TS4, which is output to the RS latch circuit 635.

The fifth one-shot pulse circuit 634 includes a delay circuit and a NOR logic gate circuit. At the fall of the chip select signal SCS, the fifth one-shot pulse circuit 634 generates a fifth trigger signal TS5, which is output to the RS latch circuit 635.

The RS latch circuit 635 includes an S terminal, an R terminal, and a Q terminal. The S terminal receives the fourth trigger signal TS4 output from the fourth one-shot pulse circuit 633. The R terminal receives the fifth trigger signal TS5 output from the fifth one-shot pulse circuit 634. The RS latch circuit 635 outputs a horizontal start pulse signal SRIN_H from the Q terminal. The RS latch circuit 635 operates in a known manner. For example, in response to a L signal input at the S terminal and a H signal input at the R terminal, the RS latch circuit 635 outputs a L signal as a horizontal start pulse signal SRIN_H from the Q terminal. This output state is maintained when the S terminal or the R terminal receives the unchanged signal or both the S terminal and the R terminal receive L signals. In response to a H signal input at the S terminal and a L signal input at the R terminal, the RS latch circuit outputs a H signal as a horizontal start pulse signal SRIN_H from the Q terminal. This output state is maintained when the S terminal or the R terminal receives the unchanged signal or both the S terminal and the R terminal receive L signals.

As illustrated in, for example, FIG. 5C, the horizontal control circuit 63 includes a combinational logic circuit 636 and a flip-flop circuit 637.

The combinational logic circuit 636 includes multiple logic gate circuits. Based on the counter signal CNT[8:0] generated by the counter circuit 61, the combinational logic circuit 636 generates a fourth control signal CS4, which is output to the flip-flop circuit 637.

The flip-flop circuit 637 includes a D terminal, a Q terminal, a CK terminal, and an XRST terminal. The D terminal receives the fourth control signal CS4 generated by the combinational logic circuit 636. The CK terminal receives the second clock signal DIV_CLK. The XRST terminal receives the chip select signal SCS. The flip-flop circuit 637 outputs a data activity signal ENB_H from the Q terminal. The flip-flop circuit 637 retains the fourth control signal CS4 at the rising edge of the second clock signal DIV_CLK, and outputs the fourth control signal CS4 as a data activity signal ENB_H.

An example circuit structure of the converter circuit 5 in the dot-matrix display device 1 according to the present embodiment will now be described. The converter circuit 5 includes a vertical converter circuit 51 and a horizontal converter circuit 55.

The vertical converter circuit 51 converts the pieces of address data A0 to A7 in the serial signal SI to a parallel signal based on the vertical start pulse signal SRIN_V output from the vertical control circuit 62. The vertical converter circuit 51 includes, as illustrated in, for example, FIG. 1, a shift register circuit 52, multiple latch activity signal circuits 53, and multiple latch circuits 54.

The shift register circuit 52 operates in synchronization with the first clock signal SCLK. The shift register circuit 52 receives the vertical start pulse signal SRIN_V output from the vertical control circuit 62.

Figure 6A:
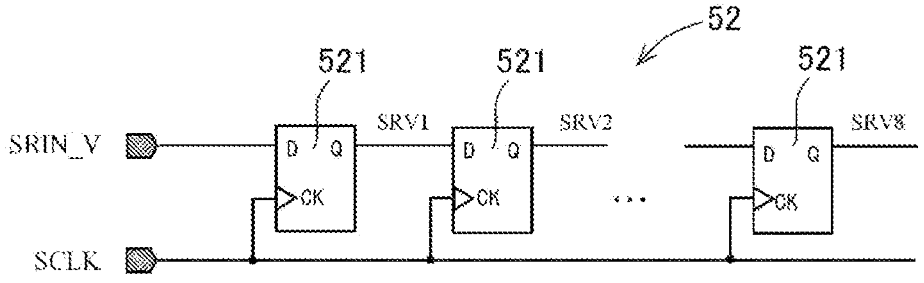
FIG. 6A is an example circuit diagram of a converter circuit in the dot-matrix display device in FIG. 1.

The shift register circuit 52 includes multiple flip-flop circuits 521 connected in series as illustrated in, for example, FIG. 6A. Each of the multiple flip-flop circuits 521 includes a D terminal, a CK terminal, and a Q terminal. The CK terminal receives the first clock signal SCLK. The first flip-flop circuit 521 receives the vertical start pulse signal SRIN_V output from the vertical control circuit 62 at its D terminal. The multiple flip-flop circuits 521 output respective vertical shift signals SRV1 to SRVn (or simply SRV collectively). For these signals, n is a positive integer determined in accordance with the number of gate signal lines 31. In the present embodiment, n=8. The second and subsequent flip-flop circuits 521 each include the D terminal connected to the Q terminal of its preceding flip-flop circuit 521. The Q terminals of the multiple flip-flop circuits 521 are connected to the respective multiple latch activity signal circuits 53.

As illustrated in, for example, FIG. 1, the multiple flip-flop circuits 521 are connected to the respective multiple latch activity signal circuits 53, and the multiple latch activity signal circuits 53 are connected to the respective multiple latch circuits 54.

Figure 6B:
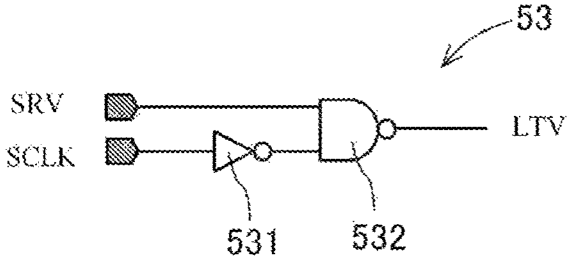
FIG. 6B is an example circuit diagram of the converter circuit in the dot-matrix display device in FIG. 1.
Figure 6C:
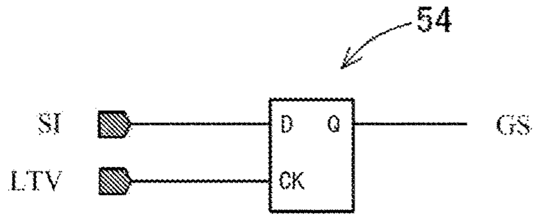
FIG. 6C is an example circuit diagram of the converter circuit in the dot-matrix display device in FIG. 1.

Each of the multiple latch activity signal circuits 53 includes, as illustrated in, for example, FIG. 6B, an inverter circuit 531 and a negated logical product (NAND) logic gate circuit (hereafter, also referred to as a NAND circuit) 532. The NAND circuit 532 includes two input terminals. One input terminal receives a vertical shift signal SRV output from the corresponding flip-flop circuit 521, and the other input terminal receives a first clock signal SCLK inverted by the inverter circuit 531. The multiple latch activity signal circuits 53 output respective vertical latch activity signals LTV1 to LTVn (or simply LTV collectively) to the respective multiple latch circuits 54.

Each of the multiple latch circuits 54 includes a D terminal, a CK terminal, and a Q terminal. Each latch circuit 54 receives, at its CK terminal, a vertical latch activity signal LTV output from a latch activity signal circuit 53 connected to it. The D terminal receives the serial signal SI provided from the signal provider. The multiple latch circuits 54 obtain the respective pieces of address data A0 to A7 in the serial signal SI during the corresponding latch activity signal LTV being a H signal, and retain the piece of address data during the corresponding latch activity signal LTV being a L signal. As illustrated in, for example, FIG. 2, the multiple latch circuits 54 output the respective pieces of address data A0 to A7 as address signals GS0 to GS7 from the Q terminals. In FIG. 2, the piece of address data A0 output as the address signal GS0 and the piece of address data A7 output as the address signal GS7 are illustrated. The address signals GS0 and GS7 in FIG. 2 may be either at a high level or a low level in the hatched areas.

The dot-matrix display device 1 includes a decoder circuit 7 and a drive circuit 8. The drive circuit 8 includes a vertical drive circuit 81 and a horizontal drive circuit 82.

The decoder circuit 7 decodes, based on the gate activity signal ENB_V output from the control circuit 6, the address signals GS0 to GS7 output from the vertical converter circuit 51, and generates decoded address signals DEC1 to DEC256 (or simply DEC collectively) for selecting one of the multiple gate signal lines 31. The decoded address signals DEC output from the decoder circuit 7 are input into the vertical drive circuit 81.

The decoder circuit 7 includes multiple NOR logic gate circuits (hereafter, also referred to as NOR circuits) 71 as illustrated in, for example, FIG. 8. In the present embodiment, the decoder circuit 7 includes as many NOR circuits 71 as the gate signal lines 31 (256 lines). Each NOR circuit 71 includes eight input terminals. The NOR circuit 71 outputs a H signal in response to input signals all L signals, and outputs a L signal in response to input signals including at least one H signal.

Each NOR circuit 71 receives eight signals out of 16 signals including the address signals GS0 to GS7 output from the vertical converter circuit 51 and their inverted signals XGS0 to XGS7 corresponding to the address signals GS0 to GS7. The multiple NOR circuits 71 each receive eight signals in a different combination. The number of combinations to select eight different signals from 16 signals of the address signals GS0 to GS7 and the inverted signals XGS0 to XGS7 is $2^8$=256. Thus, the eight signals input into the decoder circuit 7 can determine a single NOR circuit 71 that outputs a H signal, among the multiple NOR circuits 71, and the other NOR circuits 71 output L signals. In the present embodiment, as illustrated in, for example, FIG. 8, the address signals GS are inverted by k inverter circuits 72 (k is an integer greater than or equal to 0 and less than or equal to 8) located upstream from eight input terminals of each NOR circuit 71. One of the multiple NOR circuits 71 includes no inverter circuit 72 and receives the address signals GS without being inverted.

The vertical drive circuit 81 is located downstream from the decoder circuit 7. As illustrated in, for example, FIG. 9A, the vertical drive circuit 81 includes multiple AND logic gate circuits (hereafter, also referred to as AND circuits) 811. The multiple AND circuits 811 are located downstream from the respective multiple NOR circuits 71 in the decoder circuit 7.

Each AND circuit 811 includes two input terminals. One input terminal receives a decoded address signal DEC output from the corresponding NOR circuit 71 connected to the AND circuit 811, and the other input terminal receives the gate activity signal ENB_V output from the control circuit 6. The output terminals of the multiple AND circuits 811 are connected to the respective multiple gate signal lines 31.

Each pair of multiple AND circuits 811 and the corresponding multiple gate signal lines 31 may include a buffer circuit 812 between them as illustrated in, for example, FIG. 9A. Each AND circuit 811 outputs a H signal in response to both the decoded address signal DEC and the gate activity signal ENB_V being H signals, and outputs a L signal in response to at least one of the decoded address signal DEC or the gate activity signal ENB_V being a L signal. In response to the gate activity signal ENB_V being active (H signal) as illustrated in, for example, FIG. 2, the vertical drive circuit 81 can output an active gate signal GATE to one of the multiple gate signal lines 31.

The vertical drive circuit 81 illustrated in FIG. 9A includes the AND circuits 811 each including a NAND logic gate circuit and an inverter circuit that inverts an output from the logic gate circuit, thus avoiding an increase in the circuit size.

The horizontal converter circuit 55 converts the pieces of image data D0 to D255 in the serial signal SI to a parallel signal based on the horizontal start pulse signal SRIN_H output from the horizontal control circuit 63. As illustrated in, for example, FIG. 7A, the horizontal converter circuit 55 includes a shift register circuit 56, multiple latch activity signal circuits 57, and multiple latch circuits 58.

The shift register circuit 56 operates in synchronization with the first clock signal SCLK. The shift register circuit 56 receives the horizontal start pulse signal SRIN_H output from the horizontal control circuit 63.

Figure 7A:
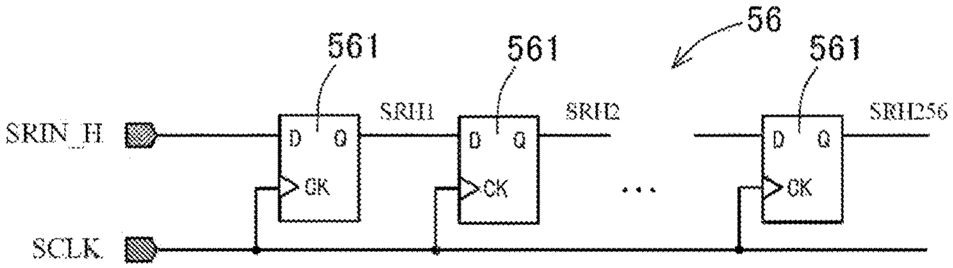
FIG. 7A is an example circuit diagram of the converter circuit in the dot-matrix display device in FIG. 1.

As illustrated in, for example, FIG. 7A, the shift register circuit 56 includes multiple flip-flop circuits 561 connected in series. For example, as illustrated in FIG. 1, the multiple flip-flop circuits 561 are connected to the respective multiple latch activity signal circuits 57, and the multiple latch activity signal circuits 57 are connected to the respective multiple latch circuits 58.

Each of the multiple flip-flop circuits 561 in the shift register circuit 56 includes a D terminal, a CK terminal, and a Q terminal. The CK terminal receives the first clock signal SCLK. The first flip-flop circuit 561 receives the horizontal start pulse signal SRIN_H output from the horizontal control circuit 63 at its D terminal. The multiple flip-flop circuits 561 output respective horizontal shift signals SRH1 to SRHm (or simply SRH collectively). For these signals, m is a positive integer equal to the number of source signal lines 32. In the present embodiment, m=256. Each of the second and subsequent flip-flop circuits 561 includes the D terminal connected to the Q terminal of its preceding flip-flop circuit 561. The Q terminals of the multiple flip-flop circuits 561 are connected to the respective multiple latch activity signal circuits 57.

Figure 7B:
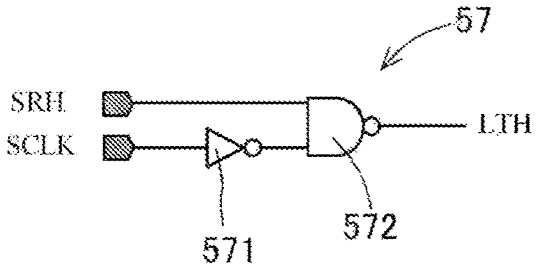
FIG. 7B is an example circuit diagram of the converter circuit in the dot-matrix display device in FIG. 1.
Figure 7C:
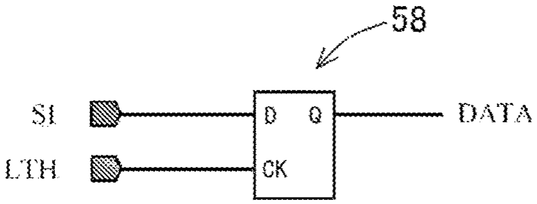
FIG. 7C is an example circuit diagram of the converter circuit in the dot-matrix display device in FIG. 1.

As illustrated in, for example, FIG. 7B, each of the multiple latch activity signal circuits 57 includes an inverter circuit 571 and a NAND logic gate circuit (hereafter, also referred to as a NAND circuit) 572. The NAND circuit 572 includes two input terminals. One input terminal receives the horizontal shift signal SRH output from the corresponding flip-flop circuit 561, and the other input terminal receives a first clock signal SCLK inverted by the inverter circuit 571. The multiple latch activity signal circuits 57 output respective horizontal latch activity signals LTH1 to LTHm (or simply LTH collectively) to the respective multiple latch circuits 58.

Each of the multiple latch circuits 58 includes a D terminal, a CK terminal, and a Q terminal. Each latch circuit 58 receives, at its CK terminal, a horizontal latch activity signal LTH output from a latch activity signal circuit 57 connected to it. The D terminal receives the serial signal SI provided from the signal provider. The multiple latch circuits 58 obtain the respective pieces of image data D0 to D255 in the serial signal SI during the corresponding latch activity signal LTH being a H signal, and retain the piece of image data during the corresponding latch activity signal LTH being a L signal. As illustrated in, for example, FIG. 2, the multiple latch circuits 58 output the respective pieces of image data D0 to D255 as data signals DATA1 to DATA 256 from the Q terminals. In FIG. 2, the image data D0 output as the image signal DATA1 and the image data D255 output as the image signal DATA256 are illustrated. The image signals DATA1 and DATA256 in FIG. 2 may be either at a high level or a low level in the hatched areas.

The horizontal drive circuit 82 is located downstream from the horizontal converter circuit 55. As illustrated in, for example, FIG. 9B, the horizontal drive circuit 82 includes multiple AND logic gate circuits (hereafter, also referred to as AND circuits) 821. The multiple AND circuits 821 are located downstream from the respective multiple latch circuits 58 in the horizontal converter circuit 55.

Each AND circuit 821 includes two input terminals. One input terminal receives a data signal DATA output from the corresponding latch circuit 58 connected to the AND circuit 821, and the other input circuit receives the data activity signal ENB_H output from the control circuit 6. The output terminals of the multiple AND circuits 821 are connected to the respective multiple source signal lines 32.

Each pair of multiple AND circuits 821 and the corresponding multiple source signal lines 32 may include a buffer circuit 822 between them as illustrated in, for example, FIG. 9B. Each AND circuit 821 outputs a H signal in response to both the data signal DATA and the data activity signal ENB_H being H signals, and outputs a L signal in response to at least one of the data signal DATA or the data activity signal ENB_H being a L signal. In response to the data activity signal ENB_H being active (H signal) as illustrated in, for example, FIG. 2, the horizontal drive circuit 82 can output write data signals SIG1 to SIG256 (or simply SIG collectively) to the respective multiple source signal lines 32.

The horizontal drive circuit illustrated in FIG. 9B includes the AND circuits 821 each including a NAND logic gate circuit and an inverter circuit that inverts an output from the logic gate circuit, thus avoiding an increase in the circuit size.

In the dot-matrix display device 1 according to the present embodiment, the control circuit 6, or specifically the counter circuit 61, operates in synchronization with the second clock signal DIV_CLK obtained by dividing the frequency of the first clock signal SCLK by two. The counter circuit 61 includes the combinational logic circuits 611 (illustrated in FIG. 5A) that determine its operation speed. Thus, a delay time T_dalay in the counter circuit 61 is independent of the clock period T2 of the second clock signal DIV_CLK, and is determined simply by the circuit structure of the counter circuit 61. In other words, the combinational logic circuits 611 in the counter circuit 61 are known to limit the maximum frequency of the first clock signal SCLK. For example, a known first clock signal SCLK has a maximum frequency of about 1.5 MHz. A first clock signal SCLK having a frequency higher than about 1.5 MHz is thus difficult to use. The inventor has noticed that the counter circuit 61 may operate at a frequency equivalent or similar to a frequency used in a known structure although a first clock signal SCLK with a higher frequency is used. To operate the counter circuit 61 properly in synchronization with the second clock signal DIV_CLK, the combinational logic circuit 611 receiving a counter signal CNT[8:0] is to generate the next counter signal NEXT_CNT[8:0] with a delay time T_delay shorter than or equal to the clock period T2. This condition is to be satisfied upon determining the minimum value T2_min of the clock period T2. In the dot-matrix display device 1 according to the present embodiment, T_delay may be less than or equal to T2_min as illustrated in, for example, FIG. 10. The second clock signal DIV_CLK is obtained by dividing the frequency of the first clock signal SCLK by two. Thus, for the first clock signal SCLK having a clock period T1, the minimum period T1_min may be as short as T_delay/2. For example, the first clock signal SCLK may have a frequency of about 3.0 MHz, and the second clock signal DIV_CLK may have a frequency of about 1.5 MHz.

In a known dot-matrix display device, a counter circuit operates in synchronization with an external clock signal (an equivalent to the first clock signal SCLK) provided from an external device. To operate the counter circuit properly, the minimum value of the external clock signal period is equal to the delay time of the counter circuit.

Thus, the frequency of the first clock signal SCLK may be doubled in the dot-matrix display device 1 according to the present embodiment as compared with the frequency in a known dot-matrix display device. The dot-matrix display device 1 according to the present embodiment can perform display control at higher speed with the first clock signal SCLK having a higher frequency, or for example, can shorten the transfer time of the serial signal SI.

In the dot-matrix display device 1 according to the present embodiment, the vertical converter circuit 51 generates the address signal GS, which is a parallel signal, based on the vertical start pulse signal SRIN_V and the address data A in the serial signal SI input serially. This simplifies the wiring for input of the address data A from outside. The vertical converter circuit 51 converts the address data A input serially to a parallel address signal GS and outputs the resulting signal to maintain a short transfer time of the address signal GS.

The decoder circuit 7 generates the decoded address signals DEC1 to DEC256 to be provided to the multiple (256) gate signal lines 31 based on the address signals GS0 to GS7. This allows the address signals GS0 to GS7 that fewer than the gate signal lines 31 to drive the multiple gate signal lines 31. This simplifies the wiring for input of the address data A from outside, thus reducing the circuit size of the vertical converter circuit 51.

In one or more embodiments of the present disclosure, a timer apparatus includes the dot-matrix display device 1 according to one or more embodiments of the present disclosure. The timer apparatus includes an elapsed time controller that controls the minimum unit time of elapsed time. This structure includes the dot-matrix display device 1 according to one or more embodiments of the present disclosure that can operate at a high speed, and can control the minimum unit time of elapsed time variously, for example, in units of 1, 0.1, 0.01, and 0.001 s. Thus, the timer apparatus according to one or more embodiments of the present disclosure can be used, for example, as a stopwatch used in athletic competitions such as sports or in speed racing such as auto racing and air racing or as a time display used in a high-speed camera.

The elapsed time controller may be a software program stored in a memory, for example, a RAM or a ROM in a drive element, for example, an IC or an LSI circuit located inside or outside the dot-matrix display device 1. The elapsed time controller may be, for example, an elapsed time control circuit formed on a circuit board located inside or outside the dot-matrix display device 1.

Figure 11:
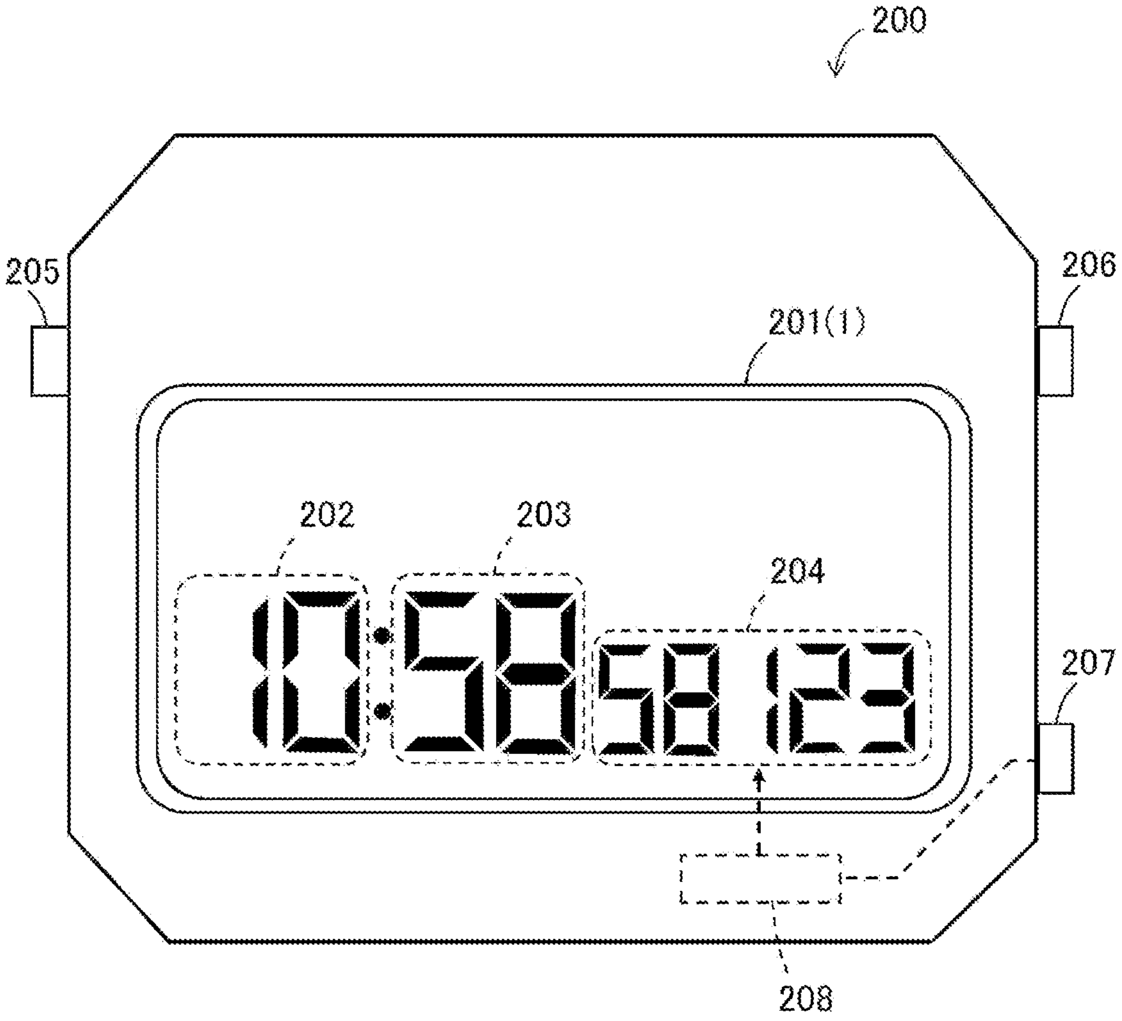
FIG. 11 is a schematic front view of a timer apparatus including the dot-matrix display device in FIG. 1.

FIG. 11 is a schematic front view of a timer apparatus 200 including the dot-matrix display device 1 according to one or more embodiments of the present disclosure. The dot-matrix display device 1 is incorporated in a display 201 of the timer apparatus 200. The display 201 includes display areas 202, 203, and 204. The timer apparatus 200 may be, for example, a stopwatch, a digital watch with a stopwatch function, or a smartwatch with a stopwatch function. The example in FIG. 11 is a digital watch with a stopwatch function. The timer apparatus 200 includes, in its peripheral portion, a timing start button 205, a timing stop button 206, and a minimum unit changer button 207 for elapsed time. Every push on the button 207 changes, through an elapsed time controller 208, the minimum unit time of the elapsed time cyclically in units of 1, 0.1, 0.01, and 0.001 s. The elapsed time controller 208 is incorporated in the timer apparatus 200. Although the timing operation is started and ended as controlled with the timing start button 205 and the timing stop button 206, a motion sensor such as a photosensor or an infrared sensor may be used to electrically control the timing operation. This allows a more precise timing operation.

The dot-matrix display device according to one or more embodiments of the present disclosure can shorten the transfer time of the address data and the image data, and can properly operate the control circuit that controls a refresh. In other words, although the clock frequency of the first clock signal is increased to shorten the transfer time of the image data, the control circuit can control the timing of serial-to-parallel conversion through the converter circuit in response to the second clock signal having a lower frequency than the first clock signal. For example, the second clock signal may have a clock frequency equivalent or similar to a frequency used in a known structure. This structure can operate the control circuit properly.

In one or more embodiments of the present disclosure, the timer apparatus includes the dot-matrix display device according to one or more embodiments of the present disclosure that can operate at a high speed. The timer apparatus can control the minimum unit time of elapsed time variously, for example, in units of 1, 0.1, 0.01, and 0.001 s.

Although the embodiments of the present disclosure have been described in detail, the present disclosure is not limited to the embodiments described above, and may be changed or varied in various manners without departing from the spirit and scope of the present disclosure. The components described in the above embodiments may be entirely or partially combined as appropriate unless any contradiction arises.

INDUSTRIAL APPLICABILITY

The dot-matrix display device according to one or more embodiments of the present disclosure may be used in various electronic devices. Such electronic devices include, for example, automobile route guidance systems (car navigation systems), ship route guidance systems, aircraft route guidance systems, indicators for instruments in vehicles such as automobiles, instrument panels, smartphones, mobile phones, tablets, personal digital assistants (PDAs), video cameras, digital still cameras, electronic organizers, electronic books, electronic dictionaries, personal computers, copiers, terminals for game devices, television sets, product display tags, price display tags, programmable display devices for industrial use, car audio systems, digital audio players, facsimile machines, printers, automatic teller machines (ATMs), vending machines, medical display devices, digital display watches, smartwatches, and information displays installed at stations and airports.

REFERENCE SIGNS

1 dot-matrix display device
2 substrate
3 display
31 gate signal line
32 source signal line
33 pixel circuit
331 write switch circuit
332 latch circuit
332*a*, 332*b* CMOS inverter
333 pixel potential generation circuit
334 liquid crystal element
334*a* pixel electrode
334*b* liquid crystal
334*c* opposite electrode
4 frequency divider circuit
41 flip-flop circuit
42 inverter circuit
5 converter circuit
51 vertical converter circuit
52 shift register circuit
521 flip-flop circuit
53 latch activity signal circuit
531 inverter circuit
532 logic gate circuit (NAND circuit)
54 latch circuit
55 horizontal converter circuit
56 shift register circuit
561 flip-flop circuit
57 latch activity signal circuit
571 inverter circuit
572 logic gate circuit (NAND circuit)
58 latch circuit
6 control circuit
61 counter circuit
611 combinational logic circuit
612 flip-flop circuit
62 vertical control circuit
621 combinational logic circuit
622 flip-flop circuit
623 first one-shot pulse circuit
624 second one-shot pulse circuit
625 third one-shot pulse circuit
626 logic gate circuit (OR circuit)
627 RS latch circuit
628 combinational logic circuit
629 flip-flop circuit
63 horizontal control circuit
631 combinational logic circuit
632 flip-flop circuit
633 fourth one-shot pulse circuit
634 fifth one-shot pulse circuit
635 RS latch circuit
636 combinational logic circuit
637 flip-flop circuit
7 decoder circuit
71 logic gate circuit (NOR circuit)
72 inverter circuit
8 drive circuit
81 vertical drive circuit
811 logic gate circuit (AND circuit)
812 buffer circuit
82 horizontal drive circuit
821 logic gate circuit (AND circuit)
822 buffer circuit
200 timer apparatus
201 display
202, 203, 204 display area
205 timing start button
206 timing stop button
207 minimum unit changer button
208 elapsed time controller

The invention claimed is:

1. A dot-matrix display device comprising:

a display including a plurality of gate signal lines extending in a first direction, a plurality of source signal lines extending in a second direction intersecting with the first direction, and a plurality of pixel circuits arranged at intersections of the plurality of gate signal lines and the plurality of source signal lines;

a converter circuit configured to obtain a serial signal in synchronization with a first clock signal input from outside, the serial signal being input from outside through a serial interface, including address data for specifying a pixel circuit of the plurality of pixel circuits to undergo a refresh of image data, and including the image data to be provided to the specified pixel circuit and convert the obtained serial signal to a parallel signal; and a control circuit configured to generate, based on a second clock signal having a lower frequency than the first clock signal, a control signal for controlling timing of serial-to-parallel conversion performed by the converter circuit, wherein each of the plurality of pixel circuits includes a latch circuit configured to retain the image data, wherein a pixel circuit of the plurality of pixel circuits in which the image data is not refreshed, displays a still image using the image data retained in the latch circuit, wherein the serial signal includes dummy data unusable for refresh, and the dummy data is transferred to the converter circuit subsequent to the address data and the image data, and wherein a transfer period of the dummy data is an active period of a gate signal during which the gate signal based on the address signal is provided to each of the plurality of gate signal lines and an active period of a source signal during which the source signal based on the image data is provided to each of the plurality of source signal lines, and further the transfer period of the dummy data is shorter than a shorter one of a transfer period of the address data and a transfer period of the image data.

2. The dot-matrix display device according to claim 1, further comprising:

a clock frequency controller configured to control a frequency of the first clock signal.

3. The dot-matrix display device according to claim 1, further comprising:

a frequency divider circuit configured to generate the second clock signal based on the first clock signal by dividing a frequency of the first clock signal.

4. The dot-matrix display device according to claim 1, further comprising:

a first clock signal generator configured to generate the first clock signal; and a second clock signal generator configured to generate the second clock signal.

5. The dot-matrix display device according to claim 1, wherein the control circuit is configured to generate the control signal based on a count signal obtained by counting a number of rising edges of the second clock signal.

6. The dot-matrix display device according to claim 5, wherein the control circuit includes a counting circuit configured to generate the count signal in synchronization with the second clock signal.

7. The dot-matrix display device according to claim 1, wherein the converter circuit includes a vertical converter circuit, the vertical converter circuit configured to convert, based on the control signal, the address data included in the serial signal to a parallel signal and to generate the address signal.

8. The dot-matrix display device according to claim 7, wherein the vertical converter circuit includes a decoder circuit, the decoder circuit configured to generate, based on the address signal, a decoded address signal to be provided to each of the plurality of gate signal lines.

9. The dot-matrix display device according to claim 1, wherein the converter circuit includes a horizontal converter circuit, the horizontal converter circuit configured to convert, based on the control signal, the image data included in the serial signal to a parallel signal and to generate a data signal to be provided to each of the plurality of source signal lines.

10. The display device according to claim 1, wherein the latch circuit is configured to retain a plurality of bits to allow the plurality of pixel circuits to display gradients.

11. A timer apparatus, comprising:

the dot-matrix display device according to claim 1; and an elapsed time controller configured to control a minimum unit time of elapsed time.

* * * * *